US008834262B2

(12) United States Patent
Amour

(10) Patent No.: US 8,834,262 B2
(45) Date of Patent: Sep. 16, 2014

(54) SYSTEMS AND METHODS FOR MANAGING GAMING ACTIVITIES WHEREIN SECOND PLAYER CAUSE SELECTION IS PREDETERMINED BY A THIRD PARTY

(76) Inventor: Marc Robert Amour, Potts Point (AU)

( * ) Notice: Subject to any disclaimer, the term of this patent is extended or adjusted under 35 U.S.C. 154(b) by 309 days.

(21) Appl. No.: 13/497,797

(22) PCT Filed: Sep. 22, 2010

(86) PCT No.: PCT/AU2010/001231
§ 371 (c)(1), (2), (4) Date: Jun. 4, 2012

(87) PCT Pub. No.: WO2011/035369
PCT Pub. Date: Mar. 31, 2011

(65) Prior Publication Data

US 2012/0252568 A1 Oct. 4, 2012

(30) Foreign Application Priority Data

Sep. 22, 2009 (AU) ................................ 2009904596
Sep. 22, 2010 (AU) ................................ 2010904283

(51) Int. Cl.
*A63F 9/24* (2006.01)
*A63F 13/00* (2014.01)
*G06F 17/00* (2006.01)
*G06F 19/00* (2011.01)

(52) U.S. Cl.
USPC ............................................... 463/25; 463/28

(58) Field of Classification Search
CPC ............................. G07F 17/3288; G07F 17/32
USPC ..................................................... 463/25, 28
See application file for complete search history.

(56) References Cited

U.S. PATENT DOCUMENTS

2002/0155886 A1* 10/2002 Kidron ............................ 463/25

* cited by examiner

*Primary Examiner* — William M. Brewster
(74) *Attorney, Agent, or Firm* — Katten Muchin Rosenman LLP

(57) ABSTRACT

The present invention is directed to a method and system of gaming where players contribute money to win a prize and a part of the money is allocated for public benefit such as charities and other welfare causes. The system gives the player control over certain features such as selecting a cause.

14 Claims, 3 Drawing Sheets

SYSTEMS AND METHODS FOR MANAGING GAMING ACTIVITIES WHEREIN SECOND PLAYER CAUSE SELECTION IS PREDETERMINED BY A THIRD PARTY

FIELD OF THE INVENTION

The present invention relates to systems and methods for providing and/or managing gaming activities. Some embodiments provide hardware and software components for the implementation of such systems and methods. The term “gaming” is intended to be interpreted in the broadest sense, as encompassing the fields of gambling, gaming, wagering, betting, lotteries and games or competitions of skill and/or knowledge and/or chance.

BACKGROUND TO THE INVENTION

The following discussion of the prior art is intended to place the invention in an appropriate context and to allow the unique characteristics and advantages of it to be more fully understood. However, any discussion of the prior art throughout the specification should in no way be considered as an express or implied admission that such prior art is widely known or forms part of common general knowledge in the field.

Historically, some gaming activities have been used as a vehicle for collecting funds for application against causes, including the likes of public works, charities, sporting teams, and the arts. In general terms, players provide entry fees in consideration for participation in the gaming activity, and those entry fees are used in part to fun a cause supported by the gaming operator. A simple example is a charitable gaming activity, such as a charity raffle, where the purpose of the gaming activity is to collect funds for a particular cause (as opposed to being conducted for the generation of profits on the part of an administrator).

SUMMARY OF THE INVENTION

It is an object of the present invention to overcome or ameliorate one or more of the disadvantages of the prior art, or at least to provide a useful alternative.

One embodiment provides a computer implemented method for managing data in relation to a gaming activity wherein a plurality of players provide respective contribution amounts in consideration for an opportunity to win a common prize subject to a common prize determination process, the method including:

providing an interface for allowing a given player to provide data indicative of a cause selection, wherein the data indicative of a cause selection designates at least one of a plurality of available cause selections;

for each player, determining a value for allocation to a cause identified by that player's cause selection; and maintaining a database for facilitating the allocation of the respective players' values to the respective causes, thereby to facilitate allocation to a plurality of causes respective portions of an overall sum of value available for allocation.

One embodiment provides a method wherein the value for allocation to a cause identified by that player's cause selection is a value related to the player's contribution amount.

One embodiment provides a method wherein the value for allocation to a cause identified by that player's cause selection is a value corresponding to a non-zero proportion of the player's contribution amount One embodiment provides a method wherein maintaining the database facilitates the allocation of the respective players' contribution amounts to the respective causes, thereby to facilitate allocation, to a plurality of causes, respective portions of the overall sum of contribution amounts received from the players that have an opportunity to win the common prize.

One embodiment provides a computer implemented method for managing contribution amounts in relation to a gaming activity gaming activity wherein a plurality of players provide respective contribution amounts in consideration for an opportunity to win a common prize subject to a common prize determination process, the method including:

maintaining data indicative of player contributions for the gaming activity;

maintaining data indicative of player cause selections, wherein each player cause selection is associable with a level of player contribution; and processing the data indicative of player contributions on the basis of the data indicative of player cause selections, thereby to identify values corresponding to proportions of the player contributions for allocation to causes identified by the player cause selections.

One embodiment provides a computer implemented method for managing contribution amounts in relation to a gaming activity gaming activity wherein a plurality of players provide respective contribution amounts in consideration for an opportunity to win a common prize subject to a common prize determination process, the method including:

determining a value corresponding to a non-zero proportion of the contribution amounts attributable to a prize pool;

determining a value corresponding to a non-zero proportion of the contribution amounts attributable to a cause pool; and allocating the cause pool amongst a plurality of causes on the basis of data indicative of player cause selections received from the players.

One embodiment provides a method for managing contributions in relation to a gaming activity gaming activity wherein a plurality of players provide respective contribution amounts in consideration for an opportunity to win a common prize subject to a common prize determination process, the method including:

defining a plurality of cause identifiers for identifying a respective plurality of causes;

determining, for a given player, (i) data indicative of a value corresponding to contribution associated with that player's participation in the gaming activity; and (ii) based on data indicative of a player cause selection, a cause identifier;

based on a predefined apportionment protocol, defining a cause portion, being a value corresponding to a non-zero proportion of the players' contributions that is for allocation amongst the plurality of causes, wherein relative allocation for each cause is based on the players' respective data indicative of player cause selections.

One embodiment provides a method wherein a given player provides data indicative of a cause selection by selecting one or more causes from a list of available causes.

One embodiment provides a method wherein a given player has an choice in relation to whether or not to explicitly provide data indicative data indicative of a cause selection, and the method includes:

for each player, determining whether the player elected to explicitly provide data indicative of a cause selection;

in the case that the player elected to explicitly provide data indicative of a cause selection, determining a non-zero proportion of the player's contribution amount for allocation to a cause identified by that player's cause selection; and in the case that the player elected not to explicitly provide data indicative of a cause selection, determining a non-zero proportion of the player's contribution amount for allocation to a selection of one or more causes made on behalf of the player.

One embodiment provides a method wherein a first player and a second player each provide data indicative of a cause selection, and wherein, for the first player, the data indicative of the cause selection is determined from an explicit choice of cause made by that player, and for the second player the data indicative of the cause selection is determined implicitly from the player obtaining one or more entries pre-packaged with a cause selection.

One embodiment provides a method wherein a given player has an option of providing data indicative of a cause selection via an explicit choice of cause or an implicit choice of cause.

One embodiment provides a method wherein an implicit choice of cause results from the player electing not to explicitly select a cause, and thereby accept a default selection of one or more causes made on behalf of the player.

One embodiment provides a method wherein an implicit choice of cause results from the player electing to purchase one or more entries pre-packaged with a cause selection.

One embodiment provides a method wherein a given player has the option of providing data indicative of a cause selection in any of three ways, being (i) with an explicit cause selection; (ii) with an implicit cause section resulting from the purchase of entries pre-packaged with a cause selection; and (iii) with an implicit cause selection resulting from electing not to explicitly select a cause, and thereby accept a default selection of one or more causes made on behalf of the player.

One embodiment provides a method wherein two or more players are grouped into a syndicate responsive to their cause selections.

One embodiment provides a computer implemented method for funding causes via a lottery-type gaming activity wherein a plurality of players provide respective contribution amounts in consideration for an opportunity to win a common prize subject to a common prize determination process, the method including:

identifying a pool of funds for allocation amongst a plurality of causes; and allocating the pool of funds amongst the plurality of causes responsive to data indicative of cause selections provided by the players.

One embodiment provides a computer implemented method for funding causes via a wagering gaming activity wherein a plurality of players wager respective bet amounts, the method including:

identifying a pool of funds for allocation amongst a plurality of causes; and allocating the pool of funds amongst the plurality of causes responsive to data indicative of cause selections provided by the players.

One embodiment provides a tangible computer readable carrier medium carrying computer executable code which, which when executed by one or more processors of a computer system, cause the computer system to perform a method as described herein.

One embodiment provides a computer system configured to perform a method as described herein.

One embodiment provides a computer program product configured to perform a method as described herein.

One embodiment provides a computer system for managing contributions in relation to a gaming activity gaming activity wherein a plurality of players provide respective contribution amounts in consideration for an opportunity to win a common prize subject to a common prize determination process, the system including:

a component for receiving data indicative of player participation, wherein the data indicative of player participation allows for the determination of data indicative of player contributions;

a component for receiving data indicative of player cause selections;

a component for determining a proportion of the player contributions for allocation amongst a plurality of causes; and a component for administering the allocation of the player contributions amongst the plurality of causes based on the data indicative of player cause selections.

One embodiment provides a computer implemented method for managing contribution amounts in relation to a commercial gaming activity wherein a plurality of players provide respective contribution amounts in exchange for participation in the gaming activity, the method including:

receiving data indicative of contribution amounts received from players; and processing the data based on a predefined apportionment protocol thereby to apportion the contribution amounts amongst a plurality of portions, wherein the portions include a prize pool portion for funding prizes in respect of the gaming activity, an administrator portion for funding profits on behalf of a gaming operator, and a non-zero cause portion for funding one or more causes.

One embodiment provides a computer implemented wherein the predefined apportionment protocol is defined such that the prize pool portion, administrator portion and cause portion collectively account for greater than approximately 75%, but less than 100%, of the contribution amounts received from players.

One embodiment provides a computer implemented wherein the predefined apportionment protocol is defined such that the prize pool portion, administrator portion and cause portion collectively account for greater than approximately 80%, but less than 100%, of the contribution amounts received from players.

One embodiment provides a computer implemented method wherein the predefined apportionment protocol is defined such that the prize pool portion, administrator portion and cause portion collectively account for greater than approximately 90%, but less than 100%, of the contribution amounts received from players.

One embodiment provides a computer implemented method wherein the predefined apportionment protocol is defined such that the prize pool portion, administrator portion and cause portion collectively account for greater than approximately 95%, but less than 100%, of the contribution amounts received from players.

One embodiment provides a method as described herein.

One embodiment provides a computer system configured to perform a method as described herein.

One embodiment provides a computer implemented method for managing contribution amounts in relation to a gaming activity wherein a plurality of players provide respective contribution amounts, the method including:

providing an interface for allowing a given player to provide data indicative of a cause selection;

for each player, determining a non-zero proportion of the player's contribution amount for allocation to a cause identified by that player's cause selection; and maintaining a database for facilitating the allocation of the respective players' contribution amounts to the respective causes.

One embodiment provides a computer implemented method for managing contribution amounts in relation to a gaming activity, the method including:

maintaining data indicative of player contributions for the gaming activity;

maintaining data indicative of player cause selections, wherein each player cause selection is associable with a level of player contribution; and processing the data indicative of player contributions on the basis of the data indicative of player cause selections, thereby to identify proportions of the player contributions for allocation to causes identified by the player cause selections.

One embodiment provides a computer implemented method for managing contribution amounts in relation to a gaming activity wherein a plurality of players provide respective contribution amounts, the method including:

determining a non-zero proportion of the contribution amounts attributable to a prize pool;

determining a non-zero proportion of the contribution amounts attributable to a cause pool; and allocating the cause pool amongst a plurality of causes on the basis of data indicative of player cause selections received from the players.

One embodiment provides a computer system for managing contributions in relation to a gaming activity, the system including:

a component for receiving data indicative of player participation, wherein the data indicative of player participation allows for the determination of data indicative of player contributions;

a component for receiving data indicative of player cause selections;

a component for determining a proportion of the player contributions for allocation amongst a plurality of causes; and a component for administering the allocation of the player contributions amongst the plurality of causes based on the data indicative of player cause selections.

One embodiment provides a method for managing contributions in relation to a gaming activity, the method including:

defining a plurality of cause identifiers for identifying a respective plurality of causes;

determining, for a given player, data indicative of a contribution associated with that player's participation in the gaming activity; and based on data indicative of a player cause selection, a cause identifier;

based on a predefined apportionment protocol, defining a cause portion, being a non-zero proportion of the players' contributions that is for allocation amongst the plurality of causes, wherein relative allocation for each cause is based on the players' respective data indicative of player cause selections.

One embodiment provides a computer implemented method for managing contribution amounts in relation to a gaming activity wherein a plurality of players provide respective contribution amounts, the method including:

providing an interface for allowing a given player to provide data indicative of a cause selection, wherein the cause selection is indicative of at least one of a plurality of available causes;

for each player, determining whether the player elected to provide data indicative of a cause selection;

in the case that the player elected to provide data indicative of a cause selection, determining a non-zero proportion of the player's contribution amount for allocation to a cause identified by that player's cause selection;

in the case that the player elected not to provide data indicative of a cause selection, determining a non-zero proportion of the player's contribution amount for allocation to a selection of one or more causes made on behalf of the player; and maintaining a database for facilitating the allocation of the respective players' contribution amounts to the respective causes.

One embodiment provides a computer implemented method for managing contribution amounts in relation to a gaming activity, the method including:

maintaining data indicative of player contributions for the gaming activity;

maintaining data indicative of player cause selections, wherein each player cause selection is associable with a level of player contribution wherein each player cause selection is indicative of at least one of a plurality of available causes; and processing the data indicative of player contributions on the basis of the data indicative of player cause selections, thereby to identify proportions of the player contributions for allocation to causes wherein:

for players that elected to make player cause selections, the proportions of the player contributions are for allocation to causes respectively identified by the player cause selections; and for players that elected not to make player cause selections, the proportions of the player contributions are for allocation to one or more causes selected on behalf of the consumer.

One embodiment provides a computer implemented method for managing contribution amounts in relation to a gaming activity wherein a plurality of players provide respective contribution amounts, the method including:

determining a non-zero proportion of the contribution amounts attributable to a prize pool;

determining a non-zero proportion of the contribution amounts attributable to a cause pool; and allocating the cause pool amongst a plurality of causes on the basis of data indicative of player cause selections received from the players wherein each player cause selection is indicative of at least one of a plurality of available causes, and wherein:

for players that elected to make player cause selections, the allocation is to causes respectively identified by the player cause selections; and for players that elected not to make player cause selections, the allocation is to one or more causes selected on behalf of the player.

One embodiment provides a computer system for managing contributions in relation to a gaming activity, the system including:

a component for receiving data indicative of player participation, wherein the data indicative of player participation allows for the determination of data indicative of player contributions;

a component for receiving data indicative of player cause selections;

a component for determining a proportion of the player contributions for allocation amongst a plurality of causes; and a component for administering the allocation of the player contributions amongst the plurality of causes based on the data indicative of player cause selections, wherein each player cause selection is indicative of at least one of a plurality of available causes, and wherein:

for players that elected to make player cause selections, the allocation is to causes respectively identified by the player cause selections; and for players that elected not to make player cause selections, the allocation is to one or more causes selected on behalf of the player.

One embodiment provides a method for managing contributions in relation to a gaming activity, the method including:

defining a plurality of cause identifiers for identifying a respective plurality of causes;

determining, for a given player, (i) data indicative of a contribution associated with that player's participation in the gaming activity; and (ii) based on data indicative of a player cause selection, a cause identifier, wherein the player cause selection is indicative of at least one of a plurality of available causes;

based on a predefined apportionment protocol, defining a cause portion, being a non-zero proportion of the players' contributions that is for allocation amongst the plurality of causes, wherein:

for players that elected to make player cause selections, the allocation is to causes identified by the respective player cause selections, with the relative allocation for each cause being based on the players' respective data indicative of player cause selections; and for players that elected not to make player cause selections, the allocation is to one or more causes selected on behalf of the player.

One embodiment provides a computer implemented method for managing contribution amounts in relation to a gaming activity wherein a plurality of players provide respective contribution amounts, the method including:

providing an interface for allowing a given player to provide data indicative of a cause selection, wherein the cause selection is indicative of at least one of a plurality of available causes;

for each player, determining a non-zero proportion of the player's contribution amount for allocation to a cause identified by that player's cause selection; and maintaining a database for facilitating the allocation of the respective players' contribution amounts to the respective causes;

wherein, for a first player, the data indicative of the cause selection is determined from an explicit choice of cause made by that player, and for a second player the data indicative of the cause selection is determined implicitly from the player obtaining one or more entries pre-packaged with a cause selection.

One embodiment provides a computer implemented method for managing contribution amounts in relation to a gaming activity, the method including:

maintaining data indicative of player contributions for the gaming activity;

maintaining data indicative of player cause selections, wherein each player cause selection is associable with a level of player contribution, wherein each player cause selection is indicative of at least one of a plurality of available causes; and processing the data indicative of player contributions on the basis of the data indicative of player cause selections, thereby to identify proportions of the player contributions for allocation to causes identified by the player cause selections;

wherein, for a first player, the data indicative of the cause selection is determined from an explicit choice of cause made by that player, and for a second player the data indicative of the cause selection is determined implicitly from the player obtaining one or more entries pre-packaged with a cause selection.

One embodiment provides a computer implemented method for managing contribution amounts in relation to a gaming activity wherein a plurality of players provide respective contribution amounts, the method including:

determining a non-zero proportion of the contribution amounts attributable to a prize pool;

determining a non-zero proportion of the contribution amounts attributable to a cause pool; and allocating the cause pool amongst a plurality of causes on the basis of data indicative of player cause selections received from the players, wherein each player cause selection is indicative of at least one of a plurality of available causes;

wherein, for a first player, the data indicative of the cause selection is determined from an explicit choice of cause made by that player, and for a second player the data indicative of the cause selection is determined implicitly from the player obtaining one or more entries pre-packaged with a cause selection.

One embodiment provides a computer system for managing contributions in relation to a gaming activity, the system including:

a component for receiving data indicative of player participation, wherein the data indicative of player participation allows for the determination of data indicative of player contributions;

a component for receiving data indicative of player cause selections;

a component for determining a proportion of the player contributions for allocation amongst a plurality of causes; and a component for administering the allocation of the player contributions amongst the plurality of causes based on the data indicative of player cause selections, wherein each player cause selection is indicative of at least one of a plurality of available causes;

wherein, for a first player, the data indicative of the cause selection is determined from an explicit choice of cause made by that player, and for a second player the data indicative of the cause selection is determined implicitly from the player obtaining one or more entries pre-packaged with a cause selection.

One embodiment provides a method for managing contributions in relation to a gaming activity, the method including:

defining a plurality of cause identifiers for identifying a respective plurality of causes;

determining, for a given player, (iii) data indicative of a contribution associated with that player's participation in the gaming activity; and (iv) based on data indicative of a player cause selection, a cause identifier, wherein the player cause selection is indicative of at least one of a plurality of available causes;

based on a predefined apportionment protocol, defining a cause portion, being a non-zero proportion of the players' contributions that is for allocation amongst the plurality of causes, wherein relative allocation for each cause is based on the players' respective data indicative of player cause selections;

wherein, for a first player, the data indicative of the cause selection is determined from an explicit choice of cause made by that player, and for a second player the data indicative of the cause selection is determined implicitly from the player obtaining one or more entries pre-packaged with a cause selection.

Reference throughout this specification to "one embodiment", "some embodiments" or "an embodiment" means that a particular feature, structure or characteristic described in connection with the embodiment is included in at least one embodiment of the present invention. Thus, appearances of the phrases “in one embodiment”, “some embodiments” or “in an embodiment” in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

It should also be noted that as used herein, unless the context clearly dictates otherwise, any reference to “a proportion” is intended to encompass the situations where that proportion is 0% or 100%, as well as any intermediate percentage.

BRIEF DESCRIPTION OF THE DRAWINGS

Preferred embodiments of the invention will now be described, by way of example only, with reference to the accompanying drawings in which.

DETAILED DESCRIPTION

Figure 1:
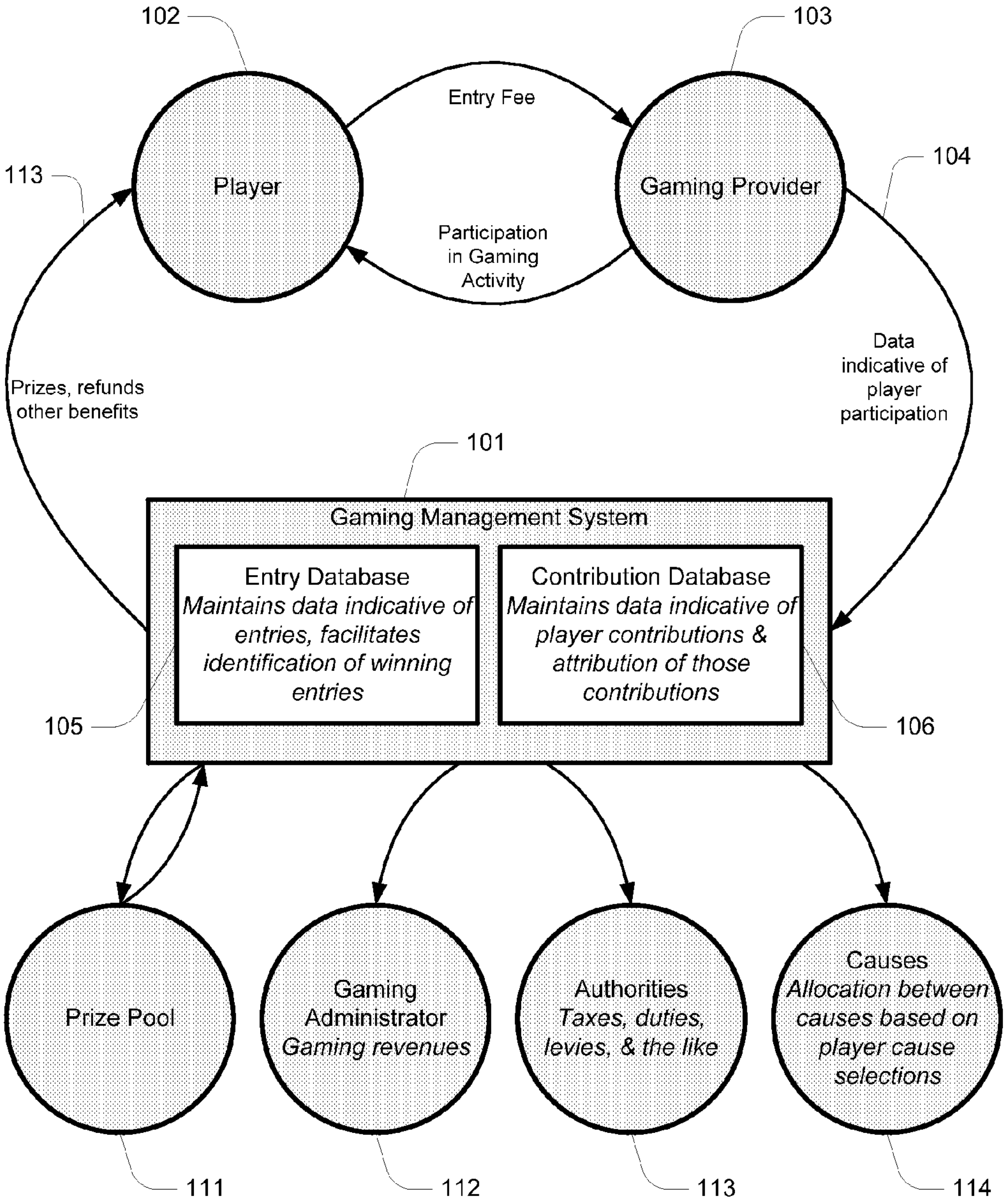
FIG. 1 illustrates a method for managing a gaming activity according to one embodiment.

Described herein are various systems and methods for providing and/or managing gaming activities, including systems and methods for managing contribution amounts for gaming activities. In overview, a plurality of players participate in a gaming activity. The players additionally explicitly or implicitly make cause selections. Based on the players' participation in the gaming activity, values (financial or otherwise) are allocated to causes based on the cause selections.

In some embodiments, each player's participation results in a financial contribution, which is split (physically or notionally) between a number of portions, for example based on a predetermined apportionment protocol. These portions include a prize pool portion, which is used to fund prizes for the gaming activity. The portions further include a cause portion, which is used to fund various predefined causes, such as the likes of charities, philanthropy, research, community projects, and the like. Players participating in the gaming activity are able to control how the cause portion is managed (and/or ultimately disbursed), and in some cases how their respective contributions to the cause portion are managed (and/or ultimately disbursed). For example, players are invited to respectively select a cause (or causes) of their choice, from a predetermined selection of available causes. This selection has a downstream effect in terms of the apportionment of funds amongst causes.

Overview of Causes

Gaming activities have commonly been used as a source of funding for public works, charities, and the like. In the context of commercial gaming activities, charges collected by an authority (such as taxes, levies and the like) are often allocated towards specified purposes. For example, in the UK the Big Lottery Fund allocates lottery derived funds, from the UK's National Lottery, to various initiatives. In some cases, gaming operators arbitrarily donate portions of their own profits to a cause or causes from time to time without any consumer input.

We note that gaming activities may be commercial gaming activities (whether conducted by a private enterprise, state owned corporation, or quasi-governmental organisation) and/or charitable gaming activities, and/or government operated gaming activities (whether explicitly profit motivated or otherwise). For the present purposes, a “commercial gaming activity” is a gaming activity operated by a non-government party, conducted primarily for commercial (i.e. profit driven) purposes. Examples include NSW Lotteries Corporation, which although being (at least presently) a NSW State Owned Corporation, is a private trading enterprise operating for the purposes of deriving profits in addition to paying duties on ticket sales to the New South Wales Government, and the lottery division of Tatts Group Limited (an ASX listed company), also being a private enterprise group of companies operating for the purposes of deriving profits as well as paying various Australian State and territory Governments duties on ticket sales. On the other hand, charitable gaming activities are conducted on a not-for-profit basis, as a direct means for raising funds for charities themselves either directly or indirectly (for example by a third party gaming operator acting on their behalf). The present embodiments are primarily directed to commercial gaming activities, although there are some applications to charitable gaming activities.

The present disclosure presents a divergence from traditional approaches, allowing players to have input on how their contribution to the gaming activity is used in terms of the funding of causes. This is achieved by the players making “cause selections” as part of their participation in a gaming activity. A player's “cause selection” impacts on, for example, the manner in which a portion of that player's contribution is applied in the context of the funding of causes.

Various embodiments described herein make reference to a gaming activity “wherein a plurality of players provide respective contribution amounts in consideration for an opportunity to win a common prize subject to a common prize determination process”. The crux of this is to distinguish situations where players participate in a common game (such as a lottery) with situations where a plurality of individual charitable gaming activities are conducted side-by-side. In that regard, various of the present embodiments are directed to large scale gaming activities which are used to fund a variety of causes, under the influence of players, as opposed to an infrastructure for operating a plurality of small-scale games having respective beneficiaries.

As used herein, reference to there being a “common prize” should not be read to indicate that a gaming activity has only a single prize. A player having an opportunity to win a common prize may have an opportunity to win one or more of a plurality of common prizes. In this manner, reference to “a common prize” in the singular is for the sake of simplicity only. Likewise, although there is a “common prize determination process”, there may be multiple common prize determination processes.

The term “cause”, as used herein, should be afforded a broad interpretation, to include substantially any target for receiving funds. By way of example, a cause may be defined in any one or more of the following ways:

- In terms of an identified entity, or group of entities (being legal entities or otherwise). This may include one or more charities, sporting organisations, medical research facilities, trusts, bodies corporate, partnerships, foundations, individuals, collectives of people or animals or objects (however organised), or the like. Such entities may be direct or indirect beneficiaries of funding.
- In terms of a concept, such as a form of research (e.g. research into a particular disease or ailment), a public initiative (such as the funding of junior sports development), and industry (for example support of the arts), an environmental project, and so on. In this regard, the ultimate physical beneficiaries may be selected by the gaming operator or an independent party.

In geographical terms. For example, a cause can describe a geographic region, optionally in conjunction with added specificities describing how funding would be applied to that region.

The term “cause” should not be read to include taxes, duties or the like. For the present purposes, a portion of player contribution allocated to taxes, duties or the like is regarded as being entirely separate from the cause portion.

The present technology allows players to designate a cause (or in some cases multiple causes) which should receive funding by way of their participation in a gaming activity. At a general level, this is achieved by way of a “cause selection”. In some cases a player makes an explicit cause selection, by selecting one or more causes from a plurality of available causes, which may be predetermined (i.e. specified as a set from which the player is permitted to make a selection). The manner in which a player makes a cause selection varies between implementations, and examples are provided further below. In some embodiments, data indicative of a player’s cause selection is received in a computer system and used to facilitate the allocation of funds amongst the relevant causes.

In various embodiments described herein, there is discussion of determining a value for allocation to a cause identified by that player’s cause selection. This value is in come cases related to the player’s participation in the gaming activity, for example being related to the player’s contribution to the gaming activity (such as a value corresponding to a non-zero proportion of the player’s contribution amount). However, other values are present in further embodiments, being monetary and/or non-monetary values.

In some cases, the value is monetary, representing a monetary value of funds for allocation to a particular cause or causes. The value is in essence quantitative, as opposed to being directly representative of physical funds. The present embodiments should in no way be limited by reference to the source of funds used to actually provide monies to causes. That is, there is no requirement that the actual funds provided by a player be allocated to a particular cause; rather the general notion is that a quantum of funds from some repository of funds is allocated to a cause, that quantum of funds corresponding to the value of the non-zero proportion of the player’s contribution amount. For example:

In some embodiments the funds are derived directly or indirectly from player contributions.

In some embodiments a gaming operator uses funds received in one draw of a lottery-type game to enable physical allocation to causes based on cause selections for another draw of the lottery-type game.

In some embodiments the funds for allocation to causes may be provided by the gaming operator, via a source of funds other than player contributions.

In some embodiments the funds for allocation to causes may be provided by third parties, such as third parties associated with the players, third parties associated with the gaming operator, third parties associated with the causes, sources of marketing/advertising revenues, government/quasi government bodies (for example via subsidies), private enterprises, ad so on. In one embodiment a third party makes a payment to a cause based on a player cause selection, the payment having a quantum related to the player’s contribution amount. Third parties may provide funding for clauses in this manner generally as a promotional activity.

In some embodiments the funds for allocation to causes may be provided by interest revenue, or other forms of return on investment.

It will be appreciated that there are a wide range of mechanisms for physically funding causes (i.e. providing monies to the causes) in the context of the present embodiments, and the underlying concepts are not necessarily limited to any particular one or more of these.

System Level Overview

Referring initially to FIG. 1, various embodiments are described by reference to a gaming management system 101. This system includes one or more computer systems configured for facilitating the implementation of various embodiments described herein, including the performance of various computer implemented methods.

In overview, a player 102 provides an entry fee to a gaming provider 103. In exchange for the entry fee, the gaming provider provides the player with a level of participation in the gaming activity. For example, this level of participation may be defined by one or more entries in the gaming activity, one or more partial entries in the gaming activity, or by reference to a value of participation. A player participating in the gaming activity has an opportunity to win a prize. The probability of a player winning a prize depends on the nature of the gaming activity, however, as a general rule, the relative probability of a player winning a prize increases proportionally with the number of entries (or chances) allocated to that player. However, in some embodiments an “entry” reflects a wager placed in respect of an odds-based gaming activity, and win probabilities apply differently in such contexts.

The interaction between player 102 and gaming provider 103 results in data 104 being provided to system 101. This data is indicative of the player’s participation in the gaming activity, and allows system 101 to determine and/or maintain various aspects of information, which may include any one or more of the following, or data indicative of any one or more of the following:

The quantum of entry fee provided by a player.

A contribution provided by the player (also referred to herein as the “player contribution” for that player). The term “contribution” is explained further below and, in some cases, is defined by the entry fee.

A cause, cause identifier, and/or player cause selection. However, as discussed below, in some embodiments such information results from a subsequent player interaction.

A risk profile selected by the player, for example in the context of a reduced risk gaming activity.

This is by no means intended to be an exclusive list, and various other aspects of information are present in further embodiments. In the present embodiments, this information is used in the context of an entry database 105 and a contribution database 106. In general terms, the former is used for entry administration, such as the identification of winning entries and allocation/redemption of prizes. The latter is concerned with financial administration, particularly the apportionment of player contributions between various portions having respective purposes. In some embodiments the distinction between these databases is notional only, with all information being maintained in a single overall database. As used herein, the term “database” refers to any means for storing data, including infrastructure spread across distributed information systems.

The term “contribution” is used herein to describe a portion of the entry fee that is not refundable to the player. The player forfeits this amount in consideration for participation in the gaming activity. In this regard, for most gaming activities the entry fee defines the contribution. However, for risk-free and reduced-risk gaming activities (such as those described in, for example, PCT/AU2007/000774), the players contribution may be greater than or less than their entry fee. In some cases a player's contribution includes a supplementary contribution amount, for example an amount derived by investment of an entry fee provided by the player, or an amount derived through marketing activities. These, along with other modes of accruing supplementary contribution, are discussed in PCT/AU2007/000774.

A player's contribution is apportioned between a plurality of purposes, based on a predefined apportionment protocol. In the present embodiment, each purpose is described by reference to a portion of the prize pool attributable to that purpose. These portions include:

- A prize pool portion 111. This is used to fund a prize pool for the gaming activity. In preferred embodiments the prize pool portion is defined by approximately 30-80% of player contributions. More preferably, the prize pool portion is defined by approximately 50-70% of player contributions. Even more preferably, the prize pool portion is defined by approximately 55-65% of player contributions.
- A gaming administrator portion 112. This includes revenues for the gaming operator, out of which net profits are preferably derived. In preferred embodiments this portion is defined by approximately 1-30% of player contributions. More preferably, this portion is defined by approximately 10-20% of player contributions.
- An authorities portion 113, which includes taxes, duties, levies and the like payable to various authorities depending on the gaming regime in place. In some cases this portion is defined by reference to aggregate "player loss" (i.e. total contribution less the total that is transferred to the prize pool) or by simple "player loss" (i.e. the total contribution of an individual ticket sale less the amount of such individual ticket sale transferred to the prize pool) or in other cases by simple proportions of aggregate or per entry contribution, or by other means as directed by authorities from time to time.
- A cause portion 114, which is allocated amongst a plurality of causes based on player cause selections, as discussed further below. In preferred embodiments the cause portion is defined by approximately 5-25% of player contributions. More preferably, the cause portion is defined by approximately 10-20% of player contributions.

Various apportionment protocols are used across different embodiments. However, there are significant advantages in apportioning player contributions such that the prize pool portion and cause portion collectively account for at least 60% of total player contributions or more preferably at least 70% of total player contributions. Another particularly advantageous apportionment is for the prize pool portion, cause portion and gaming administrator portion to collectively account for greater than approximately 75%, but less than 100%, of player contributions. Within this range, it is more preferable to be greater than 80% or 85%, or still more preferably greater than 90%. The present inventor has appreciated significant benefits stemming from a gaming activity with such apportionments (particularly in the context of a commercial gaming activity), for example in terms of public perception, marketing appeal and financial viability.

Figure 2A:
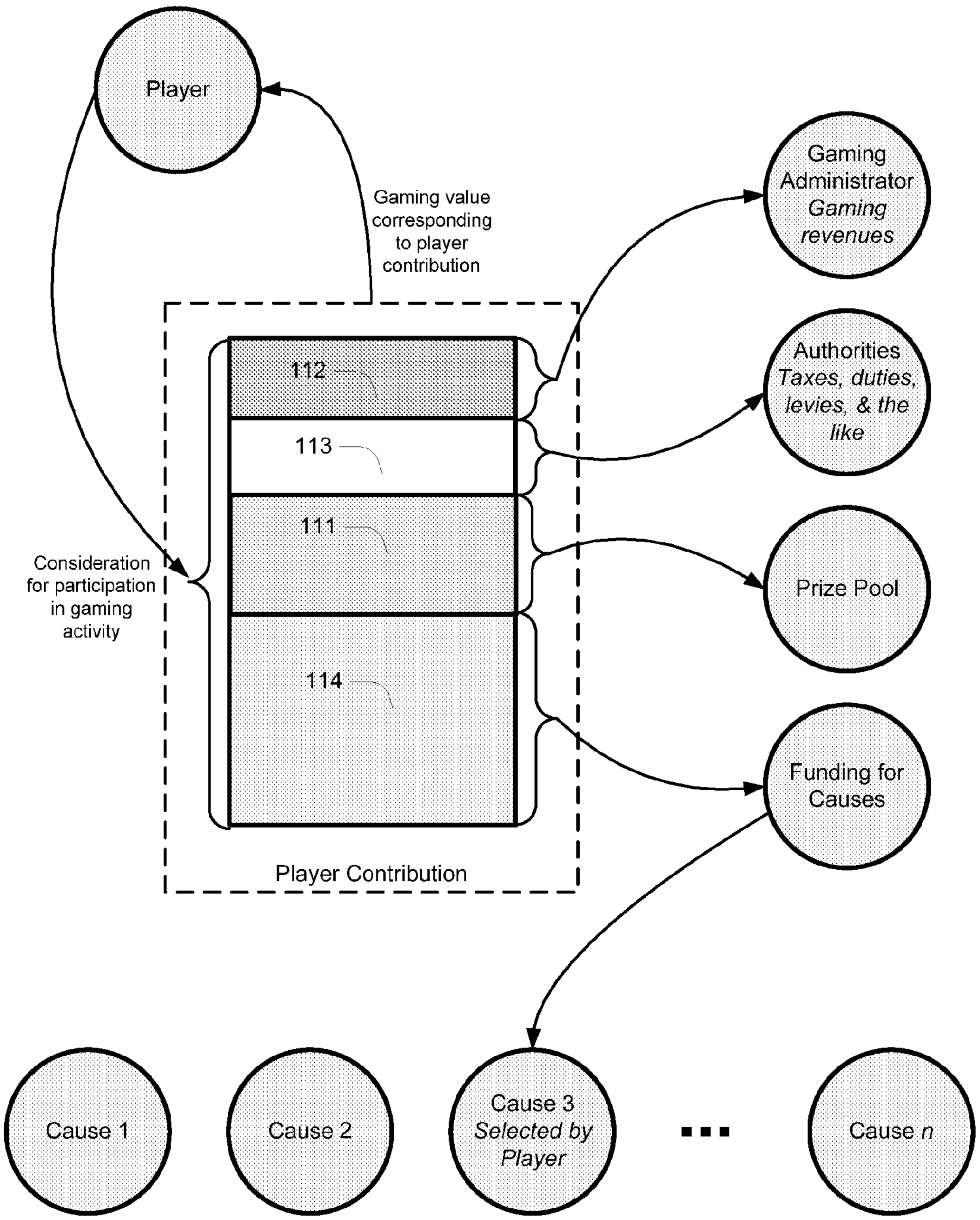
FIG. 2A schematically illustrates an apportionment protocol according to one embodiment.
Figure 2B:
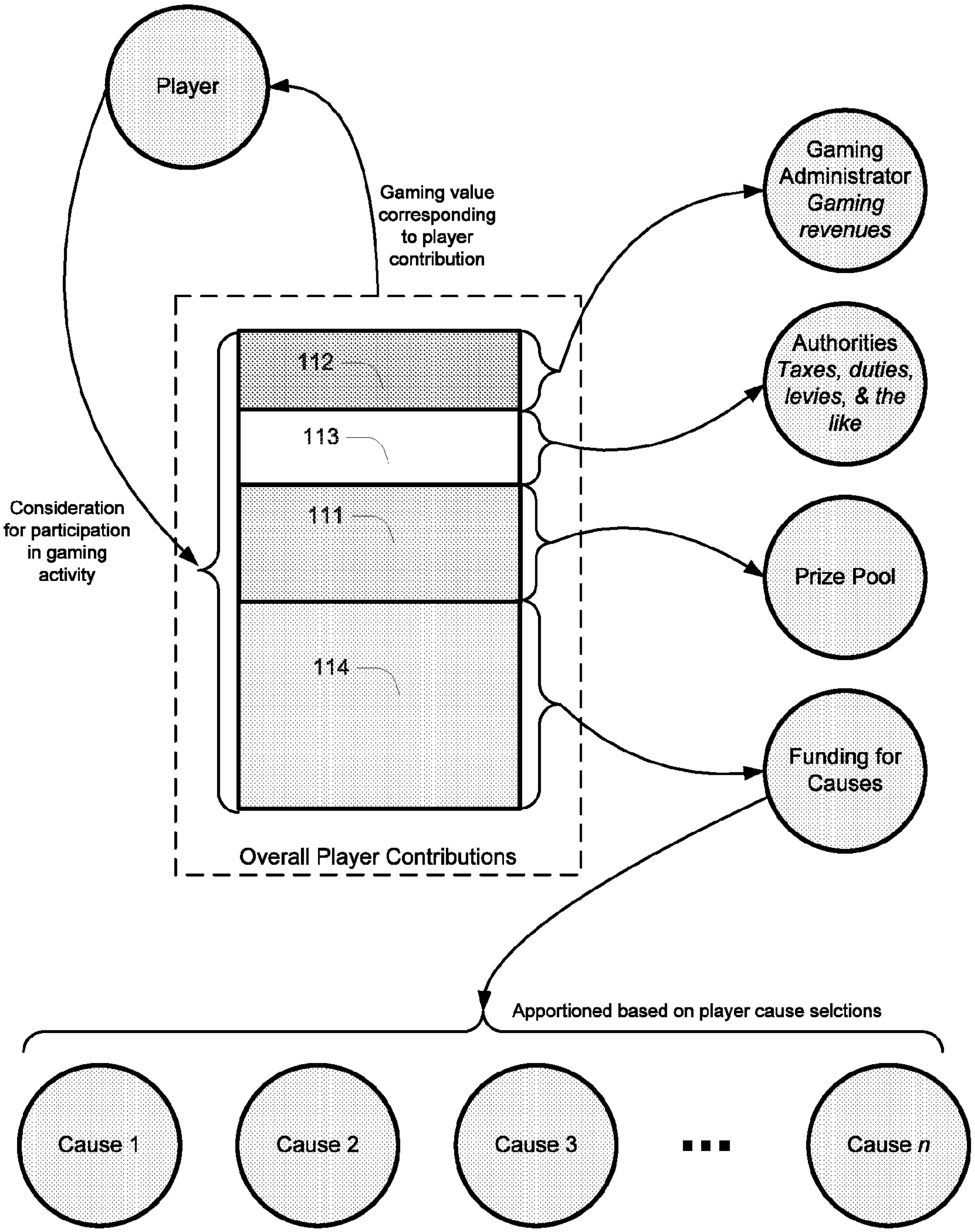
FIG. 2B schematically illustrates an apportionment protocol according to one embodiment.

In some embodiments, player contributions are accounted for and the predefined apportionment protocol applied on a contribution-by-contribution basis. This is schematically illustrated in FIG. 2A. However, in other embodiments player contributions are accounted for at an overall level, as shown in FIG. 2B. By this technique, the overall player contribution total is calculated for a given period, and apportioned based on a predefined apportionment protocol. One such approach includes apportioning the cause portion amongst the causes based on the relative popularities of causes as inferred from player cause selections, optionally adjusted based on the relatively player contributions respectively associated with those player cause selections. Another approach is for the operator to set predefined apportionments whether arbitrarily from time to time or on some other basis.

Player Cause Selections

As noted, the manner in which a player makes a cause selection varies between embodiments. Three main forms of cause selection are presently considered:

(i) An explicit cause selection whereby a player selects a cause from a set of available causes (or, in some cases, nominates a cause that is not present in the set of available causes).

(ii) An implicit cause section resulting from the purchase of entries pre-packaged with a cause selection.

(iii) An implicit cause selection resulting from electing not to explicitly select a cause, and thereby accept a default selection of one or more causes made on behalf of the player.

Each of these are discussed in more detail further below. In some embodiments only (i) is present, in other embodiments only (ii), and in other embodiments there is a combination of two or more of (i), (ii), and (iii). In the context of combination embodiments, it is key to note that the players participate in a common game (i.e. a gaming activity wherein a plurality of players provide respective contribution amounts in consideration for an opportunity to win a common prize subject to a common prize determination process). It will be appreciated from discussion below that combinations of explicit selections with either or both forms of implicit selections is particularly advantageous in some contexts.

Initially considering (i), being explicit cause selections, in some embodiments, a player completes an entry form (and/or player registration form) for initiating participation in the gaming activity. This form may be physical (such as a paper form having machine readable characteristics) or virtual (such as an electronic form presented via a graphical user interface). This form allows the player to provide various aspects of information relevant to participation in the gaming activity, such as the number or value of entries desired. The form also allows the player to select a cause from a group of predefined available causes (or, in some cases, nominate a further cause for inclusion in the group). This selection is read by a machine and provided to a computer system thereby to define data indicative of a player cause selection. In this manner, data indicative of a cause selection is received substantially at the time a player obtains participation in the gaming activity.

In some embodiments, a player selects a cause at a point in time after the purchase of entries. For example, one approach is to provide a website for allowing players to makes cause selections. In one embodiment, a player is provided an identifier associated with that player's participation in the gaming activity. This is optionally displayed on an entry receipt (which is in some cases printed or in other cases electronically presented). The player enters the identifier into a website, and is invited to provide data indicative of a cause selection, for example by checking a box on a HTML web page. Various web implementation approaches are possible, and the present disclosure should not be limited in that regard. For example, the degree of sophistication varies between embodiments. By way of example, one embodiment provides a tiered cause structure, whereby a player is able to select a high level cause (e.g. "sporting development"), and enhance this selection by subsequently selecting more detailed sub category options (for example "junior rugby league development" optionally followed by, again for example, "the Harbord Devils Junior Rugby League Club").

In some embodiments, a player has an assigned player ID, which is used to identify the player on an ongoing basis. This is particularly useful for players who regularly participate in a given gaming activity (or for encouraging regular participation). In some such embodiments, a player cause selection is associated with the player ID, such that the player's preferred cause selection is applied each time that player participates in the gaming activity. In some cases the player is able to access a website and modify his/her preferred cause selection, or modify a cause selection for some or all of his/her participation.

In some embodiments cause selections are communicated verbally by a player to a game provider (for example a vendor of entries). The gaming provider then enters the cause selection into a computer system on behalf of the player.

In some embodiments the predetermined selection is influenced by the players. For example, players are able to nominate causes for inclusion in the predetermined selection.

Various other approaches for obtaining/receiving data indicative of player cause selections are implemented in further embodiments.

As noted above, (ii) relates to an implicit cause section resulting from the purchase of entries pre-packaged with a cause selection. More specifically, in some embodiments, a cause selection is made implicitly by purchasing entries that are "pre-packaged" with a specific cause selection, and players choose particular pre-packaged entries in preference to other alternatives. For example, one approach is for a given vendor to only sell entries (whether by itself or through third party agents) that are pre-packaged with a cause selection of the vendor's choice, and a player inherently makes a cause selection by deciding to purchase entries from that vendor. In one implementation football clubs sell entires pre-packaged with cause selections indicative of their own respective clubs as a means for fund raising.

In some embodiments, pre-packaged entries are represented by physical substrates carrying branding indicative both of the gaming operator and the pre-packaged cause, of sold via an online facility carrying such branding.

There are a number of models for dealing with pre-packaged entries. One is for a party wishing to raise funds to purchase pre-packaged entries from a gaming operator at a wholesale price, and then sell those to players at a higher retail price. The difference between those prices represents the cause portion, which is retained by the party wishing to raise funds. An alternate approach is for the party wishing to raise funds to obtain pre-packaged entries at no cost, sell those at the retail price, and subsequently validate the entries by providing the wholesale price of entries sold to the gaming operator. This has some advantages in terms of risk management for the party wishing to raise funds (as that party need not take the risk of laying down money for entries which might not be able to be sold). A further model is for payments in relation to pre-packaged entries to be made directly to the gaming operator. One such embodiment involves a business model whereby a gaming provider equips a party wishing to raise funds with a payment facility (such as a web-service or a portable POS terminal) which allows the party to sell pre-packaged entries, with the received funds being appropriately directed (i.e. to the party and to the gaming operator).

Pre-packaged entries are particularly useful in allowing parties to raise funds for their respective causes whilst leveraging a large-scale existing gaming activity (such as a lottery). In essence, at least in some embodiments, they provide players with an alternate mode of entry into an existing lottery, which provides added incentive for participation on the basis of a direct connection between the purchase of entries and the support of a particular cause.

Moving onto (iii), this relates to an implicit cause selection resulting from electing not to explicitly select a cause (i.e. not explicitly make a cause selection), and thereby accept a default selection of one or more causes made on behalf of the player (i.e. make an implicit cause selection by inactivity). In the present embodiments, it is assumed that a player electing not to make an explicit selection (although invited to do so) constitutes a selection in itself. A default selection is inferred for such players. For example, one approach is to invite players to select between a plurality of causes, or simply accept a default selection made on their behalf. In some cases the default selection is a random selection, in some cases it is a selection made based on a predefined protocol (for example using factors such as other player selections as input criteria, optionally thereby to favour funding of popular or unpopular causes), and in other cases it is defined by one or more causes identified by the gaming operator or independent third party (optionally with external influencing factors, such as a panel or voting community). In some cases the default allocation is to a holding fund for which a specific beneficiary or group of beneficiaries is yet to be identified.

It is appreciated that (ii) and (iii) are in some ways similar, in the sense that a default selection might in some cases be considered as a pre-packaged cause selection.

Exemplary Embodiments

Various exemplary embodiments are discussed below. These are provided as examples only, and should not be regarded as necessarily limiting.

One embodiment provides a computer implemented method for managing contribution amounts in relation to a gaming activity, being a gaming activity wherein a plurality of players provide respective contribution amounts. Although the present terminology refers to a "plurality of players", that should be read to encompass situations where each player is dealt with individually. The method includes providing an interface for allowing a given player to provide data indicative of a cause selection. This interface may include substantially any computer interface (such as a web interface whereby input devices are rendered at a client terminal, which may be any device including a microprocessor, such as a computer, cellular telephone, PDA, digital media device, laptop computer, netbook, or the like) or a proprietary interface (such as a local application, which optionally communicates with a central server). The interface "allows" the player to provide data indicative of a cause selection in the sense that it is configured to receive such data either directly from the player, or indirectly from the player (for example via one or more intermediaries). The method further includes, for each player, determining a non-zero proportion of the player's contribution amount for allocation to a cause identified by that player's cause selection. As noted above, this may be an inferred cause selection, in the event that the player does not actively select or nominate a particular cause. The method further includes maintaining a database for maintaining data for all of the players. This facilitates the allocation of the respective players' contribution amounts to the respective causes identified by their cause selections. That is, in the case that funding is provided to causes on a periodic basis, the information in this database allows for determination of actual amounts for allocation (and ultimately distribution) to each individual cause, for example based on the overall total of player contributions for that period (or, more particularly, the cause portion as determined by a predetermined apportionment protocol that is implemented).

For the present purposes, any reference to there being "a cause identified" should be taken to include a situation where a single cause is identified, and/or a situation where multiple causes are identified. In terms of a player identifying multiple causes via a cause selection, there are various ways by which this is implemented. In some cases, a player makes cause selections such that a proportion (or unit of monetary value) of his/her contribution to the cause portion is allocated to one cause, and another one or more proportions (or units of monetary value) is/are allocated to other causes. This may apply on a per-entry basis, or over a period of participation. In relation to the latter, a player may request that the first X units of monetary value is provided to one cause, then the next Y units of monetary value to another cause, and so on.

A further embodiment provides a computer implemented method for managing contribution amounts in relation to a gaming activity. The method includes maintaining data indicative of player contributions for the gaming activity. For example, as players provide entry fees for participation in a gaming activity, information is centrally pooled so as to account for the total player contribution amount. The method further includes maintaining data indicative of player cause selections. Each player cause selection is associable with a level of player contribution. For example, this may be by way of a weighting calculated based on a predetermined unit contribution value, or by way of an association with a player contribution amount value. The method additionally includes processing the data indicative of player contributions on the basis of the data indicative of player cause selections, thereby to identify proportions of the player contributions for allocation to causes identified by the player cause selections. This makes use of a predetermined apportionment protocol for determining the proportion of player contributions (individual or overall) that is attributable to the funding of causes. In one case, the amount for allocation is calculated by applying that protocol to firstly determine the total amount available for allocation to causes (i.e. the cause portion), and then apportioning that amount amongst causes based on calculation that makes use of data indicative of player cause selections.

A further embodiment provides a computer implemented method for managing contribution amounts in relation to a gaming activity wherein a plurality of players provide respective contribution amounts. The method includes determining a non-zero proportion of the contribution amounts attributable to a prize pool (either on contribution-by-contribution basis, or on an overall basis), determining a non-zero proportion of the contribution amounts attributable to a cause pool (again either on contribution-by-contribution basis, or on an overall basis), and allocating the cause pool amongst a plurality of causes on the basis of data indicative of player cause selections received from the players. As used herein, "allocating" may refer simply to a computer process of data association, and does not require any physical transfer of funds. The determination of prize pool and cause portions is preferably based on a predetermined apportionment protocol, which optionally takes into account variable factors such as aggregate or simple "player loss" or by other means of government duty or levy or taxation calculations all as described earlier. Various apportionment protocols are used across different embodiments. However, there are significant advantages in apportioning player contributions such that the prize pool portion and cause portion collectively account for at least 60% of total player contributions or more preferably at least 70% of total player contributions. Another particularly advantageous apportionment is for the prize pool portion, cause portion and gaming administrator portion to collectively account for greater than approximately 75%, but less than 100%, of player contributions. Within this range, it is more preferable to be greater than 80% or 85%, or still more preferably greater than 90%. The present inventor has appreciated significant benefits stemming from a gaming activity with such apportionments (particularly in the context of a commercial gaming activity), for example in terms of public perception, marketing appeal and financial viability.

A further embodiment provides a computer system for managing contributions in relation to a gaming activity. The system includes:

A component for receiving data indicative of player participation, wherein the data indicative of player participation allows for the determination of data indicative of player contributions.

A component for receiving data indicative of player cause selections.

A component for determining a proportion of the player contributions for allocation amongst a plurality of causes.

A component for administering the allocation of the player contributions amongst a plurality of causes based on the data indicative of player cause selections.

These components may be embodied in hardware, software, or a combination of hardware and software. Furthermore, the components may be provided via distributed systems and/or distributed locations.

A further embodiment provides a method for managing contributions in relation to a gaming activity. The method includes defining a plurality of cause identifiers for identifying a respective plurality of causes. That is, these cause identifiers are used in an information system to facilitate identification of causes. The method also includes determining, for a given player, data indicative of a contribution associated with that player's participation in the gaming activity. Additionally, based on data indicative of a player cause selection, a cause identifier is identified for that player. A cause portion is defined based on a predefined apportionment protocol, the cause portion defining a non-zero proportion of the players' overall contributions that is for allocation to the plurality of causes. The relative allocation for each cause is based on the players' respective data indicative of player cause selections.

Syndication

The embodiments described herein generally assume that each player obtains a respective one or more entries in a gaming activity, and makes a cause selection in respect of those entries. However, in some embodiments syndication is used to group players together for the purpose of game participation. Specifically, in some embodiments two or more players are grouped into a syndicate responsive to their cause selections. For example, one approach is for all players that make the same cause selection to be combined into a syndicate for the purpose of game participation, with prizes being either allocated to an identified winning one or more players of the syndicate, or shared amongst all players in the syndicate responsive to the player's respective relative contributions.

Syndication can be particularly advantageous in terms of pre-packaged entries, as a single syndicated entry can be provided in respect of all players purchasing a particular cause's pre-packaged entries, thereby simplifying operational considerations.

Syndication also has advantages in terms of providing a chance of winning that is greater than the sum of the parts (that is, a $100 syndicated entry may have a greater relative probability of winning a prize than ten $10 standard entries).

A further advantage of syndication is the ability to sell participation for values other than integral multiples of single entry costs. For example, if a single entry costs $1, part shares in a syndicated entry may be sold for less then $1. Such an approach may be used to entice/facilitate additional low-cost participation.

Numerical Examples

Numerical examples are provided below to facilitate an understanding of how some practical embodiments operate. These should not be regarded as limiting in any way.

For the sake of this example, it is assumed that all entry fees are placed at risk, and that the predefined apportionment protocol dictates that 20% of player contribution be apportioned to a cause portion. This example uses a player-by-player approach to allocating the cause portion.

A player provides an entry fee of $10. The player's contribution is therefore $10.

Of this $10, $2 is apportioned to the cause portion.

We assume that the player makes a cause selection indicative of "Cause A".

Therefore, an amount of $2 is allocated to Cause A.

In the following example, it is again assumed that all entry fees are placed at risk, and that the predefined apportionment protocol dictates that 20% of player contribution be apportioned to a cause portion. This example uses an overall approach to allocating the cause portion.

During a given accounting or gameplay period, players provide a total in entry fees of $1,000,000. The players' contribution is therefore $1,000,000.

Of this $1,000,000, $200,000 is apportioned to the cause portion.

Assume that there were 100,000 players, who each purchased a $10 entry. Further assume that, via their cause selections, 50% of the players selected Cause A, 30% selected Cause B, 10% selected Cause C, and the remaining 10% made no active cause selection, and were therefore inferred to have selected Cause A (which is set as default).

In light of the above assumptions, $60,000 is allocated to Cause A, $30,000 is allocated to Cause B, and $10,000 is allocated to Cause C.

The following example elaborates on the previous. Again, it is assumed that all entry fees are placed at risk, and that the predefined apportionment protocol dictates that 20% of player contribution be apportioned to a cause portion. Furthermore:

During a given accounting or gameplay period, players provide a total in entry fees of $1,000,000. The players' contribution is therefore $1,000,000.

Of this $1,000,000, $200,000 is apportioned to the cause portion.

A large number of players participate, providing varying contribution amounts which collectively total to $1,000,000.

Each player's cause selection is weighted by their respective percentage contribution to the total contribution (which is the same as their respective percentage contribution to the cause portion). For example, the weighting of a cause selection for a player who purchases $100 in entries is twice that of a player who purchases $50 in entries.

The weighted cause selections are tallied thereby to determine proportions of the cause portion for allocation to each cause. For example, if from this process it is determined that 40% of the total player contributions came from players who selected Cause A, then 40% of the cause portion (i.e. $80,000) is allocated to Cause A.

It will be appreciated that a variety of mathematical methods could be performed to realize the result of the example above. The disclosed approach should not be regarded as limiting. For example, the above weighting approach would have a similar effect to a per-entry approach (when aggregated).

In the case of reduced-risk or risk-free lotteries, there is an additional degree of complication in determining the players' contribution amounts, and refundable monies are excluded. However, it will be appreciated that this is a relatively straightforward exercise in the circumstances.

Comments and Interpretation

The present approaches leverage traditional notions whereby gaming activities are used to serve the public benefit, and extend those notions by providing an element of player control. This is expected to improve the social acceptability and economic viability of gaming activities In this and other respects, the present invention, and embodiments thereof, represent a practical and commercially significant improvement over the prior art.

In the context of the present disclosure, it is assumed that a gaming activity is an activity where multiple players provide respective entry fees. In exchange for the entry fees, the players are respectively allocated one or more entries. The term "player" as used herein refers to a provider of an entry fee. The term should be construed broadly to include both human players, non-human players, constructs or syndicates defined by a group of two or more human and/or non human players (such as a collaboration between human players), and other legal entities (such as corporations or trusts). In some cases, the player is identified in a computing system by a unique identifier, which might include a purpose-defined identifier, identifier based on personal information, email address, cellular telephone number, or the like.

In the context of the present disclosure, there is discussion of players being "allocated" entries and disclosure of players being "provided" entries. The terms "allocated" and "provided" are regarded as synonymous in this regard. Furthermore, neither of these terms should imply a requirement that a player actually physically receives any entries (although, equally, they may do so), only that the entries are notionally allocated to that player.

Although players are considered to provide respective entry fees, it will be appreciated that in some instances a single player provides multiple entry fees on multiple occasions. In some cases, a definition is applied whereby a player who participates (i.e. provides entry fees) on multiple occasions is regarded as a different player each time. In other cases, the player is able to be identified across all instances of participation (for example via a player ID or the like).

In the present context, the term "entry fee" describes a sum of consideration that constitutes a wholly or partially refundable payment. No specific implications or connotations should be drawn from the use of the word "fee", which is descriptive only. In some embodiments the entry fee is provided in whole or in part as monetary currency. In other embodiments the entry fee is notionally derived—such as where a consumer purchases predefined goods and/or services unrelated to an entry, and an entry fee is notionally determined as a function of the purchase value, or where the player participates in marketing activities (by viewing advertisements or responding to a survey, for instance), and an entry fee is notionally defined on the basis of a benefit the gaming operator or a third party receives by virtue of the player's participation in those marketing activities. That is, by purchasing a certain product, a consumer is deemed to have provided an entry fee, and is correspondingly allocated one or more entries. In the presently considered embodiments, the entry fee is wholly provided for the purpose of participation in a gaming activity.

In some embodiments, the "entry fee" defines only a portion of the sum of consideration provided by a player in exchange for one or more entries. For example, in some embodiments a player provides an entry amount, including an entry fee and an additional component, this additional component being, in some cases, attributable to an operator service charge. In some embodiments, although an entry fee is fully refundable, it is only the entry fee component of an entry amount that is fully refundable, with the additional component being non-refundable. It should also be appreciated that the "entry fee" need not be monetary in nature at all, but could constitute any tradable commodity having a real, virtual, deemed or perceived value.

References to "refunds", "refundable" entry fees, and the like should be understood, unless the context dictates otherwise, to encompass full and partial refunds, as well as gross and net refunds. In some instances, for example, a nominal refund may be subject to taxes, duties, levies or other charges, such that the net refund actually received by a player is less than the nominal or gross refund, irrespective of whether that refund is notionally full or partial. Such variations should not be considered to depart from the substance or scope of the present invention.

As used herein, the terms "gaming" and "gaming activity" should be construed broadly so as to encompass any form of gambling, gaming, or wagering, including but not limited to:

- Risk free and reduced risk gaming activities, for example as described further below.
- Lotteries and lottery type games. In the context of the Australian market, particular examples include "Lotto", "Oz Lotto", "Powerball", "Art Union Lotteries", and the like. In the context of the US market, particular examples include "Hot Lotto", "Mega Millions", "Powerball", "Paycheck", and "Tri-State".
- Traditional draw lotteries, instant lotteries and "scratch" lotteries.
- Raffles, or other games where a player is provided with one or more unique tickets carrying respective ticket identifiers, and one or more winners are identified based on the selection of one or more winning ticket identifiers.
- "Keno", "Bingo" and "Housie", "Tombola" and "Chinese Raffle" style games where players seek to reconcile their own numbers with numbers drawn from an independent objective source.
- Sports betting activities and football pools, whether pari-mutuel or "fixed-odds" based.
- Events-based betting activities involving such outcomes as political contests, Royal or noteworthy births, weather outcomes and natural phenomena.
- Totalisators.
- Sweepstakes for any events such as horse, dog or any other form of racing, sporting contests, political contests and the like.
- PC-based and other electronic gaming contests, including online chance-based, skill-based or combination chance/skill-based gaming contests. These include online video games, where outcomes are in part dependant on a player's skill, and in some cases in part dependent on random factors including chance.
- Other games or contests of skill and/or knowledge and/or chance.
- Chance-based games played on poker and other electronic gaming machines.
- Any games of skill and/or chance involving one or more unknown outcomes, whether pari-mutuel or "fixed-odds" based.
- Other gaming activities described in PCT/AU2007/000774, PCT/AU2007/001978, PCT/AU2007/000780, PCT/AU2008/001348 or PCT/AU2009/000460. It will be appreciated that, in all of these examples, multiple players provide respective entry fees and, in exchange for the entry fees, the players are respectively provided with one or more entries.

The term "pari-mutuel" refers generally to a gaming arrangement whereby prizes are funded in whole or in part by entry fees. This term is intended to be synonymous with "paramutual", "para-mutual", "parimutuel" "mutual betting" and other variants.

As noted, in some embodiments the present technology is implemented in the context of a risk free gaming activity, or a reduced risk gaming activity. Examples of risk free and reduced risk gaming activities are provided in PCT/AU2007/000774, which discloses the use of "risk profiles" for allowing players to select refundable and at risk proportions of their respective entry fees. In general terms, "risk free" refers to a scenario where an entry fee is 100% refundable, and reduced risk refers for a scenario where an entry fee has a non-zero proportion is this refundable. The notion of risk free gaming activities, as discussed herein, extends to cover activities such as change-based investment activities, such as Bonus Bonds in New Zealand, or Prize Bonds in Ireland, or "Save and Win" accounts whereby consumers have an opportunity to win prizes by maintaining their savings with a particular institution.

A "method for managing a gaming activity" includes substantially any method related to or associated with a gaming activity. This includes, but is not limited to, methods performable by administrators of gaming activities, methods performable by vendors of entries in gaming activities, methods performable by players, computer implemented methods performable in relation to the administration of gaming activities and/or sale of entries in such gaming activities, and so on. Likewise, a "system for managing a gaming activity" includes substantially any hardware component or group of hardware components associated with the performance of a method for managing a gaming activity. For example, such systems include information systems maintained or implemented by or on behalf of administrators of gaming activities, vendors of entries in gaming activities, or the players themselves.

As used herein, the term "gaming operator" describes a party or group of parties responsible for the carriage and administration of a gaming activity. That is, a gaming operator is responsible for tasks including, but not limited to defining entry parameters and other predefined terms and conditions for the gaming activity, offering for sale entries in exchange for entry fees, receiving entry fees from players, allocating entries to players in exchange for those entry fees, identifying one or more winning entries, and arranging for the distribution of prizes among the players. In practice, these tasks are often performed by a number of parties. For example, a first category of party (such as vendors or agents) may be responsible for offering for sale entries in exchange for entry fees and receiving entry fees from players, whilst a second party may be responsible for identifying one or more winning entries. However, this is ignored for the present purposes, and the term "gaming operator" should be read sufficiently broadly so as to cover whatever group of related and/or unrelated parties are responsible for the carriage and administration of a particular gaming activity.

Thus, in some cases, a gaming activity may be provided by a plurality of parties, which might or might not be related or affiliated. Additionally, in some cases, a gaming activity may include a plurality of sub-activities, such as individual lotteries, that might in themselves be provided by differing parties. However, it should be appreciated that a plurality of such sub-activities, regardless of the nature of the relationship between providing parties, should be considered as a single gaming activity in the context of the present disclosure. In some cases, a plurality of sub-activities may be conducted by differing parties in different locations and/or with differing branding. However some or all of the entry fees from these sub-activities might be notionally or physically combined into a common pool, for example to facilitate investment, risk management or infrastructure sharing activities. In such cases, the sub-activities should certainty be collectively regarded as a single gaming activity in the context of the present disclosure.

The term "complementary" is primarily used herein with reference to relative percentages of two mutually exclusive components or proportions, primarily the proportion of an entry fee that is placed at risk, and the "complementary" proportion that is refundable (or vice versa). In this context, if a given proportion is X %, then the complementary proportion would be 100%-X %.

It is appreciated that various embodiments described herein include or refer to practices or subject matter that may be considered as being contrary to local laws in various jurisdictions. To the extent that the claims below cover subject matter that is contrary to the local laws of a particular jurisdiction, the claims should be interpreted in that jurisdiction in a manner so as to exclude any practices or subject matter that is indeed contrary to those local laws. A particular example presently considered is Sharia law, which may adopt a contrary stance to various aspects of gaming and investment as described herein. However, those skilled in the art will recognize how certain embodiments of the invention may nevertheless be implemented in accordance with Sharia law.

Unless specifically stated otherwise, it should be appreciated that throughout the specification terms such as "processing," "computing," "calculating," "determining", "analyzing" or the like, in some embodiments refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in some embodiments, performable by one or more processors that accept computer-readable (also called machine-readable) code containing a set of instructions that, when executed by one or more of the processors, carry out at least one of the methods described herein, or a variation on at least one of the methods described herein. Any processor capable of executing a set of instructions (sequential or otherwise) that specify actions to be taken should be included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" or "device" shall also be taken to include any collection of machines that individually or jointly execute a set (or multiple sets) of instructions to perform any one or more of the methodologies discussed herein.

At least one embodiment of each of the methods described herein is in the form of a computer-readable carrier medium carrying a set of instructions (such as a computer program) that are for execution on one or more processors, (such as one or more processors that are part of an information system). Thus, as will be appreciated by those skilled in the art, embodiments of the present invention may be embodied as a method, an apparatus such as a special purpose apparatus, an apparatus such as a data processing system, or a computer-readable carrier medium (such as a computer program product). The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (such as a computer program product on a computer-readable storage medium) carrying computer-readable program code embodied in the medium.

The software may further be transmitted or received over a network via a network interface device or other communications interface. While the carrier medium is shown in an exemplary embodiment to be a single medium, the term "carrier medium" should be taken to include a single medium or multiple media (such as a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing system (such as a computer) executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Although the invention has been described with reference to specific examples, it will be appreciated by those skilled in the art that the invention may be embodied in many other forms. While there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulae given above are merely representative of procedures that may be used. Functionality may be added or deleted from the block diagrams and operations may be interchanged among functional blocks. Steps may be added to or deleted from methods described herein whilst remaining within the scope of the present invention.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms "comprising", "comprised of", or "which comprises" is an open term that means including at least the elements/features that follow, but not excluding others. Thus, the term "comprising", when used in the claims, should not be interpreted as being limitative to the means or elements or steps listed thereafter. For example, the scope of the expression a device comprising A and B should not be limited to devices consisting only of elements A and B. Any one of the terms "including", "which includes" or "that includes" as used herein is also an open term that also means including at least the elements/features that follow the term, but not excluding others. Thus, "including" is synonymous with and means the same as "comprising".

The invention claimed is:

1. A computer implemented method for managing data in relation to a gaming activity, the method including:

operating one or more microprocessors thereby to maintain data representing respective contribution amounts provided by a plurality of players for the gaming activity, wherein the gaming activity is configured such that the players provide the respective contribution amounts in consideration for an opportunity to win a common prize subject to a common prize determination process;

operating one or more microprocessors thereby to provide an interface configured to allow a given player to provide data indicative of a cause selection, wherein the data indicative of a cause selection designates at least one of a plurality of available cause selections;

operating one or more microprocessors thereby to determine. for each player, a value for allocation to a cause identified by that player's cause selection, wherein the value for allocation to a cause identified by that player's cause selection is a value corresponding to a non-zero proportion of the player's contribution amount;

operating one or more microprocessors thereby to maintain a database for facilitating the allocation of the respective players' values to the respective causes; and operating one or more microprocessors thereby to allocate, to a plurality of causes respective portions of an overall sum of value available for allocation, wherein a predetermined proportion of the contribution amounts provided by the players is distributed based on the allocation;

wherein for each player, the value allocated to a cause identified by that player's cause selection in the case that the player wins a prize subject to the prize determination process is equal to the value allocated to a cause identified by that player's cause selection in the case that the player does not win a prize subject to the prize determination process;

wherein a first player and a second player each provide data indicative of a cause selection, and wherein:

for the first player, the data indicative of the cause selection is determined from an explicit choice of cause made by that player via the interface; and for the second player the data indicative of the cause selection is predetermined by a third party prior to the player obtaining one or more entries in the gaming activity, such that the one or more entries are pre-associated with that cause selection.

2. A method according to claim 1 including providing funds from the respective contribution amounts provided by the plurality of players to the plurality of causes in accordance with the cause selections.

3. A method according to claim 2 wherein maintaining the database facilitates the allocation of the respective players' contribution amounts to the respective causes, thereby to facilitate allocation, to a plurality of causes, respective portions of the overall sum of contribution amounts received from the players that have an opportunity to win the common prize.

4. A computer implemented method for managing contribution amounts in relation to a gaming activity gaming activity, the method including:

operating one or more microprocessors thereby to maintain data representing respective contribution amounts provided by a plurality of players for the gaming activity, wherein the gaining activity is configured such that the players provide the respective contribution amounts in consideration for an opportunity to win a common prize subject to a common prize determination process:

operating one or more microprocessors thereby to maintain data indicative of player contributions for the gaming activity;

operating one or more microprocessors thereby to maintain data indicative of player cause selections, wherein each player cause selection is associable with a level of player contribution; and operating one or more microprocessors thereby to process the data indicative of player contributions on the basis of the data indicative of player cause selections, thereby to identify values corresponding to proportions of the player contributions for allocation to causes identified by the player cause selections, wherein a predetermined proportion of the contribution amounts provided by he players is distributed based on the identified values:

wherein for each player, the value allocated to a cause identified by that player's cause selection in the case that the player wins a prize subject to the prize determination process is equal to the value allocated to a cause identified by that player's cause selection in the case that the player does not win a prize subject to the prize determination process;

wherein a first player and a second player each provide data indicative of a cause selection, and wherein:

for the first player, the data indicative of the cause selection is determined from an explicit choice of cause made by that player via the interface: and for the second player the data indicative of the cause selection is predetermined by a third party prior to the player obtaining one or more entries in the gaming activity, such that the one or more entries are pre-associated with that cause selection.

5. A computer implemented method for managing contribution amounts in relation to a gaming activity, the method including:

operating one or more microprocessors thereby to maintain data representing respective contribution amounts provided by a plurality of players for the gaming activity, wherein the gaming activity is configured such that the players provide the respective contribution amounts in consideration for an opportunity to wino common prize subject to a common prize determination process:

operating one or more microprocessors thereby to determine a value corresponding to anon-zero proportion of the contribution amounts attributable to a prize pool;

operating one or more microprocessors thereby to determine a value corresponding to anon-zero proportion of the contribution amounts attributable to a cause pool; and operating one or more microprocessors thereby to allocate the cause pool amongst a plurality of causes on the basis of data indicative of player cause selections received from the players, wherein a predetermined proportion of the contribution amounts provided by the players is distributed based on the allocation;

wherein for each player, the proportion of the contribution amount distributed in the case the player wins a prize subject to the prize determination process is equal to the proportion of the contribution amount distributed in the case that the player does not win a prize subject to the prize determination process;

wherein a first player and a second player each provide data indicative of a cause selection, and wherein:

for the first player, the data indicative of the cause selection is determined from an explicit choice of cause made by that player via the interface; and for the second player the data indicative of the cause selection is predetermined by a third party prior to the player obtaining one or more entries in the gaming activity, such that the one or more entries are pre-associated with that cause selection.

6. A method for managing contributions in relation to a gaming activity, the method including:

operating one or more microprocessors thereby to maintain data representing respective contribution amounts provided by a plurality of players for the gaming activity, wherein the gaming activity is configured such that the players provide the respective contribution amounts in consideration for an opportunity to win a common prize subject to a common prize determination process:

operating one or more microprocessors thereby to define a plurality of cause identifiers for identifying a respective plurality of causes;

operating one or more microprocessors thereby to determine, for a given player, (i) data indicative of a value corresponding to contribution associated with that player's participation in the gaming activity; and (ii) based on data indicative of a player cause selection, a cause identifier;

operating one or more microprocessors thereby to define based on a predefined apportionment protocol, a cause portion, being a value corresponding to a non-zero proportion of the players' contributions that is for allocation amongst the plurality of causes, wherein relative allocation for each cause is based on the players' respective data indicative of player cause selections, wherein a predetermined proportion of the contribution amounts provided by the players is distributed based on the relative allocations, and wherein for each player, the proportion of the contribution amount distributed in the case that the player wins a prize subject to the prize determination process is equal to the proportion of the contribution mount distributed in the case that the player does not win a prize subject to the prize determination process;

wherein a first player and a second player each provide data indicative of cause selection, and wherein:

for the first player, the data indicative of the cause selection is determined from an explicit choice of cause made by that player via the interface; and for the second player the data indicative of the cause selection is predetermined by a third party prior to the player obtaining one or more entries in the gaming activity, such that the one or more entries are pre-associated with that cause selection.

7. A method according to any preceding claim wherein a given player provides data indicative of a cause selection by selecting one or more causes from a list of available causes.

8. A method according to any one of claims 1 to 6 wherein a given player has a choice in relation to whether or not to explicitly provide data indicative data indicative of a cause selection, and the method includes:

for each player, determining whether the player elected to explicitly provide data indicative of a cause selection;

in the case that the player elected to explicitly provide data indicative of a cause selection, determining a non-zero proportion of the player's contribution amount for allocation to a cause identified by that player's cause selection; and in the case that the player elected not to explicitly provide data indicative of a cause selection, determining a non-zero proportion of the player's contribution amount for allocation to a selection of one or more causes made on behalf of the player.

9. A method according to any one of claims 1 to 6 wherein a given player has an option of providing data indicative of a cause selection via an explicit choice of cause or from the player electing not to explicitly select a cause, and thereby accept a default selection of one or more causes made on behalf of the player.

10. A method according to any one of claims 1 to 6 wherein a given player has the option of providing data indicative of a cause selection in any of three ways, being (i) with an explicit cause selection; (ii) with an implicit cause section resulting from the purchase of entries pre-packaged with a cause selection; and (iii) with an implicit cause selection resulting from electing not to explicitly select a cause, and thereby accept a default selection of one or more causes made on behalf of the player.

11. A method according to any one of claims 1 to 6 wherein two or more players are grouped into a syndicate responsive to their cause selections.

12. A computer implemented method for funding causes via a lottery-type gaming activity, the method including:

operating one or more microprocessors thereby to maintain data representing respective contribution amounts provided by a plurality of players for the gaming activity, wherein the gaming activity is configured such that the players provide the respective contribution amounts in consideration for an opportunity to win a common prize subject to a common prize determination process:

identifying a pool of funds for allocation amongst a plurality of causes; and allocating the pool of funds amongst the plurality of causes responsive to data indicative of cause selections provided by the players, wherein a predetermined proportion of the contribution amounts provided by the players is distributed based on the allocation;

wherein a first player and a second player each provide data indicative of a cause selection, and wherein:

for the first player, the data indicative of the cause selection is determined from an explicit choice of cause made by that player via the interface; and for the second player the data indicative of the cause selection is predetermined by a third party prior to the player obtaining one or more entries in the gaming activity, such that the one or more entries are pre-associated with that cause selection.

13. A computer implemented method for funding causes via a wagering gaming activity, the method including:

operating one or more microprocessors thereby to maintain data representing bet amounts, wherein a plurality of players in the wagering gaming activity wager respective bet amounts, the method including:

identifying a pool of funds for allocation amongst a plurality of causes, wherein the pool of funds is defined as a proportion of bet amounts; and allocating the pool of funds amongst the plurality of causes responsive to data indicative of cause selections provided by the players, wherein a predetermined proportion of funds collected from players via the wagering game is distributed based on the allocation;

wherein a first player and a second player each provide data indicative of a cause selection, and wherein:

for the first player, the data indicative of the cause selection is determined from an explicit choice of cause made by that player via the interface; and for the second player the data indicative of the cause selection is predetermine by a third party prior to the player obtaining one or more entries in the gaming activity, such that the one or more entries are pre-associated with that cause selection.

14. A tangible computer readable carrier medium carrying computer executable code which, which when executed by one or more processors of a computer system, cause the computer system to perform a method according to any one of claims 1 to 6, 12 or 13.

* * * * *